United States Patent [19]

Nakayama

[11] Patent Number: 4,465,803

[45] Date of Patent: Aug. 14, 1984

[54] AQUEOUS EMULSION COMPOSITION

[75] Inventor: Yasuharu Nakayama, Hiratsuka, Japan

[73] Assignee: Kansai Paint Co., Ltd., Hyogo, Japan

[21] Appl. No.: 220,086

[22] Filed: Dec. 24, 1980

[30] Foreign Application Priority Data

Dec. 29, 1979 [JP] Japan .............................. 54-172054
Feb. 1, 1980 [JP] Japan .............................. 55-10014

[51] Int. Cl.³ ............................................. C08F 2/16
[52] U.S. Cl. .................................... 524/460; 525/286
[58] Field of Search ................. 525/301, 293, 286; 260/29.6 TA; 524/460

[56] References Cited

U.S. PATENT DOCUMENTS

| | | | |
|---|---|---|---|
| 3,002,940 | 10/1961 | Holloway | 524/460 |
| 3,083,172 | 3/1963 | Scott et al. | 524/460 |
| 3,170,963 | 2/1965 | Ravve et al. | 525/286 |
| 3,435,096 | 3/1969 | Limbert et al. | 524/460 |
| 3,507,932 | 4/1970 | Morduchowitz et al. | 525/286 |
| 3,514,500 | 5/1970 | Osmond et al. | 260/874 |
| 3,583,955 | 6/1971 | Holicky et al. | 525/286 |
| 3,640,931 | 2/1972 | Clarke et al. | 260/23 EM |
| 3,641,210 | 2/1972 | Fellers et al. | 525/286 |
| 3,660,144 | 5/1972 | Johnson et al. | 525/286 |
| 3,786,116 | 1/1974 | Milkovich et al. | 525/286 |
| 3,810,859 | 5/1974 | Mikofalvy | 525/286 |
| 3,872,047 | 3/1975 | Jandourek | 525/286 |
| 3,948,866 | 4/1976 | Pennewiss et al. | 525/301 |
| 4,064,087 | 12/1977 | Das | 525/286 |
| 4,108,946 | 8/1978 | Kamada et al. | 524/460 |
| 4,170,582 | 10/1979 | Mori et al. | 260/29.6 TA |

OTHER PUBLICATIONS

Textbook of Polymer Science by Fred. W. Billneyer, Jr., pp. 329–331 and 310–313.
A.C.S.–Advances in Chemistry Series 125-1973, "Fractionation of Linear Polyethylene with Gel Permeation Chromatography", pp. 98–107.

Primary Examiner—Joseph L. Schofer
Assistant Examiner—N. Sarofim
Attorney, Agent, or Firm—Wenderoth, Lind & Ponack

[57] ABSTRACT

An aqueous emulsion composition which is the product of emulsion polymerization in water of at least one radical-polymerizable unsaturated monomer in the presence of a water-soluble resin having a graft-polymerizable unsaturated group in the side chain.

12 Claims, No Drawings

AQUEOUS EMULSION COMPOSITION

This invention relates to a novel aqueous emulsion composition which when formulated into a coating composition and coated on a substrate, gives a coated film which has excellent water resistance and gloss, does not show tackiness at its surface even at the early stage of curing, and does not turn yellow.

In recent years, aqueous emulsion compositions have come into use as resource-saving anti-pollutant paints superseding oily paints in fields where the oily paints have previously been used. An emulsion composition obtained by using a conventional ionic or nonionic low molecular or high molecular surface-active agent as a dispersion stabilizer becomes unstable when large amounts of film-forming additives are contained therein. In order to use such an emulsion composition in these fields, a film obtained from it must be made very dense, and for this purpose, a water-soluble resin is usually added to the emulsion composition. Since this water-soluble resin usually contains a neutralizing agent and a water-soluble organic solvent, the emulsion system becomes very unstable by the presence of the neutralizing agent and the water-soluble organic solvent. In addition, the water resistance of the coated film is inferior because of the use of an ionic or nonionic low molecular or high molecular substance as a dispersion stabilizer. These defects have precluded conventional emulsion compositions from wide commercial acceptance. Furthermore, the use of such a conventional emulsion composition as an adhesive has the disadvantage that the surface active agent in the composition oozes out onto the surface of the adhesive to stain its surface.

Various attempts have therefore been made to obtain an aqueous emulsion composition which is free from the aforesaid defects of conventional aqueous emulsion compositions containing ordinary ionic or nonionic low molecular or high molecular surface-active agents as dispersion stabilizers. One of such attempts involves the use of a water-soluble resin as the dispersion stabilizer, and for example, water-soluble acrylic resins, maleinized polybutadiene, maleinized oils, maleinized alkyd resins, etc. were proposed for use as dispersion stabilizers. The water-soluble acrylic resins have favorable properties, but because a hydrophilic portion and a non-hydrophilic portion are not clearly distinct from each other in the molecular skeleton of such an acrylic resin, it is difficult to obtain an emulsion composition having superior stability by using such a water-soluble acrylic resin as a dispersion stabilizer. In order to avoid this inconvenience, attempts have been made to use the water-soluble acrylic resins after modifying them into block copolymers or graft copolymers. However, such block copolymers and graft copolymers having the desired properties have not been discovered so far.

The other water-soluble resins such as maleinized polybutadiene, maleinized oils and maleinized alkyd resins are soft flexible resins and contain a number of oxidation-curable groups. Accordingly, an aqueous emulsion composition containing such a water-soluble resin as a dispersion stabilizer gives a coated film which exhibits tackiness at the early stage of its curing and turns yellow on long-term exposure. Consequently, its uses are limited.

It is an object of this invention therefore to provide an aqueous emulsion composition having excellent dispersion stability which is capable of giving a cured film which exhibits excellent water resistance, yellowing resistance and gloss, and has a tack-free surface of good feel even in the early stage of curing.

Another object of this invention is to provide a coating composition capable of giving a cured film which exhibits excellent water resistance, yellowing resistance and gloss, and has a tack-free surface of good feel even in the early stage of curing.

Other objects and advantages of this invention will become apparent from the following description.

According to this invention, there is provided an aqueous emulsion composition prepared by emulsion-polymerizing at least one radical-polymerizable unsaturated monomer in water in the presence of a water-soluble resin having a graft-polymerizable unsaturated group in the side-chain.

Since the aqueous emulsion composition provided by the present invention does not contain an ordinary ionic or nonionic low molecular or high molecular surface-active substance or a known water-soluble oxidation-curable resin as a dispersion stabilizer, it has the advantage that a cured coated film prepared from it has excellent water resistance, yellowing resistance and gloss and does not show tackiness. Even when this composition is used as an adhesive, it is free from the defect that the dispersion stabilizer oozes out to stain the surface of the adhesive.

The water-soluble resin used as a dispersion stabilizer in the aqueous emulsion composition of this invention has in the resin skeleton a graft polymerizable unsaturated group which has an insufficient chain transfer effect and can form a long side chain by grafting. Accordingly, even when it is used in a small amount, the water-soluble resin moderately reacts with the radical polymerizable unsaturated monomer during the emulsion polymerization to form a long side chain, and simultaneously, polymer particles are formed by the emulsion polymerization of the radical polymerizable unsaturated monomer itself. Thus, the graft reaction product and the polymer particles are well entangled with each other to form an aqueous emulsion composition having excellent dispersion stability.

The "water-soluble resin having a graft-polymerizable unsaturated group in the side chain" used as a dispersion stabilizer in the aqueous emulsion composition of this invention should be a resin which by itself can be water-solubilized by neutralization treatment with acids or alkalies, and has the ability to form a film having sufficient durability.

Typical examples of the water-soluble resin are described below. It should be understood however that these are merely illustrative, and are not intended to limit the scope of the invention.

(A) Water-soluble resins prepared by addition reaction between carboxyl-containing vinyl polymers and glycidyl-containing vinyl monomers:

Advantageously, the "carboxyl-containing vinyl polymers" used to prepare the water-soluble resins are obtained by copolymerizing $\alpha,\beta$-ethylenically unsaturated carboxylic acids with radical-polymerizable unsaturated monomers in a customary manner. The $\alpha,\beta$-ethylenically unsaturated carboxylic acids include unsaturated aliphatic mono- or polycarboxylic acids of the type wherein an addition-polymerizable double bond exists between the carbon atom to which the carboxyl group is bonded and an adjacent carbon atom. Suitable acids are those containing 3 to 8 carbon atoms, particularly 3 to 5 carbon atoms, and one or two carboxyl groups. Those of the following general formula

wherein $R_1$ represents a hydrogen atom or a lower alkyl group, $R_2$ represents a hydrogen atom, a lower alkyl group or a carboxyl group, and $R_3$ represents a hydrogen atom, a lower alkyl group or a carboxyl-lower alkyl group, are peferred. In formula (I), the lower alkyl group preferably has up to 4 carbon atoms, and a methyl group is especially preferred.

Examples of the $\alpha,\beta$-ethylenically unsaturated carboxylic acid are acrylic acid, methacrylic acid, crotonic acid, itaconic acid, maleic acid, maleic anhydride, fumaric acid, and monoalkyl ($C_{1-8}$) esters of maleic acid. These carboxylic acids can be used either singly or as a mixture of two or more.

The "radical-polymerizable unsaturated monomer" which is radical-polymerizable with the $\alpha,\beta$-ethylenically unsaturated carboxylic acid may be any monomer which has a radical polymerizable ethylenically unsaturated bond ($>C=C<$), and can be selected broadly depending upon the properties desired of the aqueous emulsion composition as a final product. Typical examples of such an unsaturated monomer are given below.

(a) Acrylic or methacrylic acid esters:

$C_{1-18}$ alkyl or cycloalkyl esters of acrylic or methacrylic acid such as methyl acrylate, ethyl acrylate, propyl acrylate, isopropyl acrylate, butyl acrylate, hexyl acrylate, octyl acrylate, lauryl acrylate, cyclohexyl acrylate, methyl methacrylate, ethyl methacrylate, propyl methacrylate, isopropyl methacrylate, butyl methacrylate, hexyl methacrylate, octyl methacrylate, lauryl methacrylate and cyclohexyl methacrylate; alkoxyalkyl esters of acrylic or methacrylic acid such as methoxybutyl acrylate, methoxybutyl methacrylate, methoxyethyl acrylate, methoxyethyl methacrylate, ethoxybutyl acrylate and ethoxybutyl methacrylate; $C_{2-8}$ hydroxyalkyl esters of acrylic or methacrylic acid such as hydroxyethyl acrylate, hydroxyethyl methacrylate, hydroxyethyl methacrylate, hydroxypropyl acrylate and hydroxypropyl methacrylate; mono- esters between acrylic or methacrylic acid and polyalkylene glycols (e.g., polyethylene glycol or polypropylene glycol), such as polyethylene glycol monoacrylate, polyethylene glycol monomethacrylate, polypropylene glycol monoacrylate and polypropylene glycol monomethacrylate; and adducts between glycidyl acrylate or glycidyl methacrylate and $C_{2-18}$ mono- carboxylic compounds (e.g., acetic acid, propionic acid, stearic acid, or lauric acid).

(b) Vinyl aromatic compounds:

Styrene, $\alpha$-methylstyrene, vinyltoluene, p-chlorostyrene and vinylpyridine.

(c) Polyene compounds:

Butadiene, isoprene and chloroprene.

(d) Acrylic or methacrylic acid amides:

Acrylamide, N-methylol acrylamide, and N-butoxymethyl acrylamide.

(e) Other compounds:

Acrylonitrile, methacrylonitrrile, ethylene, propylene, butene, meythylisopropenyl ketone, vinyl acetate, vinyl propionate, vinyl chloride, vinylidene chloride, vinyl esters (vinyl esters of aliphatic or aromatic monobasic or polybasic acids), Veova monomer (a trademark for a product of Shell Chemical Co.), and dialkyl ($C_{1-8}$) esters of maleic acid.

These unsaturated monomers are properly selected according to the desired properties, and may be used singly or as a mixture of two or more.

In the present invention, the "glycidyl-containing vinyl monomer" which adds to the carbonyl group of the carboxyl-containing vinyl polymer prepared from the aforesaid monomer may be a monomer having one glycidyl group of the formula

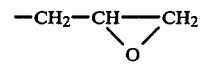

and one ethylenically unsaturated bond ($>C=C<$) in the molecule. Examples are glycidyl acrylate, glycidyl methacrylate and allyl glycidyl ether.

Copolymerization of the $\alpha,\beta$-ethylenically unsaturated carboxylic acid with the radical-polymerizable unsaturated monomer is carried out by methods known per se for production of acrylic copolymers, for example by a solution-polymerization, emulsion-polymerization or suspeension-polymerization technique. Advantageously, it is carried out by the solution polymerization method. Generally, the copolymerization can be carried out by reacting the two components in a suitable inert solvent in the presence of a polymerization catalyst at a temperature of usually about 0° to about 180° C., preferably about 40° to about 170° C., for a period of about 1 to about 20 hours, preferably about 4 to about 10 hours.

The solvent used is desirably a water-miscible solvent capable of dissolving the resulting copolymer so that gellation does not occur during the copolymerization reaction. Examples of such a solvent include Cellosolve-type solvents, carbitol-type solvents, glymer-type solvents, Cellosolve acetate-type solvents, and alcohol-type solvents.

The polymerization catalyst may be a radical initiator for usual radical polymerization, such as azo compounds, peroxide compounds, sulfides, sulfines, diazo compounds, nitroso compounds and redox systems.

In the copolymerization reaction, the ratio of the $\alpha,\beta$-ethylenically unsaturated carboxylic acid and the radical-polymerizable unsaturated monomer is not strictly limited, and can be varied depending upon the number of graft polymerizable side chains required of the water-soluble resin. Generally, the weight ratio of the $\alpha,\beta$-ethylenically unsaturated carboxylic acid to the radical polymerizable unsaturated monomer is from 3:97 to 70:30, preferably from 7:93 to 50:50.

The carboxyl-containing vinyl polymer obtained by the aforesaid reaction may have a number average molecular weight of generally about 300 to about 100,000, preferably about 800 to about 50,000, and an acid value of generally 10 to 300, preferably 30 to 200.

The carboxyl-containing vinyl polymer so prepared can be subjected as such to addition reaction with the glycidyl-containing vinyl monomer in a solvent to give a water-soluble resin as a dispersion stabilizer. The addition reaction can be performed at a reaction temperature of about 60° to about 220° C., preferably about 120° to about 170° C., for a reaction period of about 0.5 to about 40 hours, preferably 3 to 10 hours.

The glycidyl-containing vinyl monomer is added in an amount of generally 0.1 to 30% by weight, preferably 0.5 to 10% by weight, based on the total weight of the carboxyl-containing vinyl polymer and the glycidyl-containing vinyl monomer.

The production of the water-soluble resin described above has the advantage that since the polymerization reaction and the addition reaction can be continuously carried out in an organic solvent, the production is very easy, and the resulting resin solution can be used in the as-obtained form as a dispersion stabilizer for an emulsion.

(B) Water-soluble resins prepared by the addition reaction of a vinyl polymer containing a carboxyl group and a hydroxyl group with vinyl isocyanate or a monoadduct between a diisocyanate compound and a hydroxyl-containing acrylic monomer:

The "vinyl polymer containing a carboxyl group and a hydroxyl group" used to prepare the water-soluble resin of this type is prepared in the same way as in the process for producing the aforesaid carboxyl-containing vinyl polymer except that a hydroxyl-containing acrylic monomer, for example the $C_{2-8}$ hydroxyalkyl ester of acrylic or methacrylic acid exemplified in (a) above as typical examples of the radical-polymerizable unsaturated monomer, and the aforesaid α,β-unsaturated carboxylic acid such as the carboxylic acid of formula (I) are used as essential components, and as required, the aforesaid other radical-polymerizable unsaturated monomer is used as a comonomer component, and a hydroxyl-containing solvent is not used as the solvent.

The vinyl polymer so produced having both a carboxyl group and a hydroxyl group may have an acid value of generally 10 to 300, preferably 30 to 200, and a hydroxyl value of generally 2 to 150, preferably 5 to 50, and a number average molecular weight of about 300 to about 100,000, desirably 800 to 50,000.

The water-soluble resin is prepared by addition reaction of the resulting vinyl polymer containing a carboxyl group and a hydroxyl group with vinyl isocyanate or a mono-adduct formed between a diisocyanate compound and a hydroxyl-containing acrylic monomer (the mono-adduct is referred to hereinbelow as an "isocyanate-modified acrylic monomer").

The "isocyanate-modified acrylic monomer" is obtained by reacting the hydroxyl-containing acrylic monomer with the diisocyanate compound. Suitable hydroxyl-containing acrylic monomers used are, for example, the $C_{2-8}$ hydroxyalkyl esters of acrylic or methacrylic acid, and the monoesters of acrylic or methacrylic acid with polyethylene glycol or polypropylene glycol shown as typical examples (a) of the radical polymerizable unsaturated monomer used in the production of the carboxyl-containing vinyl polymer in section (A) above.

The "diisocyanate compound" to be reacted with the hydroxyl-containing acrylic monomer may be any of aliphatic, alicyclic, aromatic and araliphatic diisocyanate compounds normally used in the production of polyurethane.

Specific examples of the diisocyanate compounds are given below.

OCN—(CH$_2$)$_a$—NCO (a = 2-12),

OCN—CH$_2$—CH$_2$—S—CH$_2$—CH$_2$—NCO,

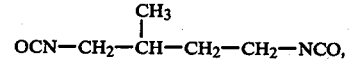
OCN—CH$_2$—CH(CH$_3$)—CH$_2$—CH$_2$—NCO,

-continued

OCN—CH$_2$—CH$_2$—CH$_2$—O—CH$_2$—CH$_2$—CH$_2$—NCO,

OCN—CH$_2$—CH$_2$—CH(OCH$_3$)—CH$_2$—CH$_2$—CH$_2$—NCO,

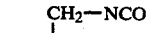
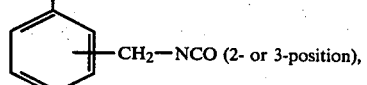 CH$_2$—NCO (2- or 3-position),

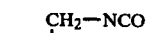
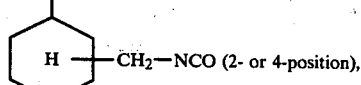 CH$_2$—NCO (2- or 4-position),

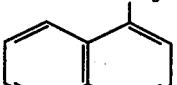
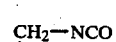
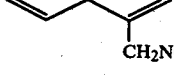

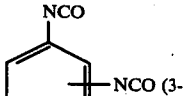 NCO (3- or 4-position), 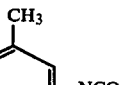 NCO,

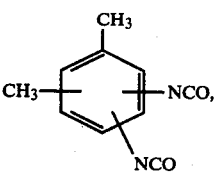

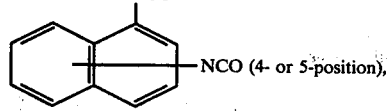 NCO (4- or 5-position),

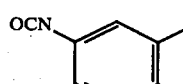
 NCO (6- or 7-position),

 NCO (2- or 4-position),

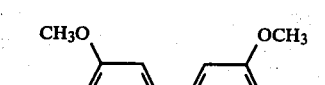

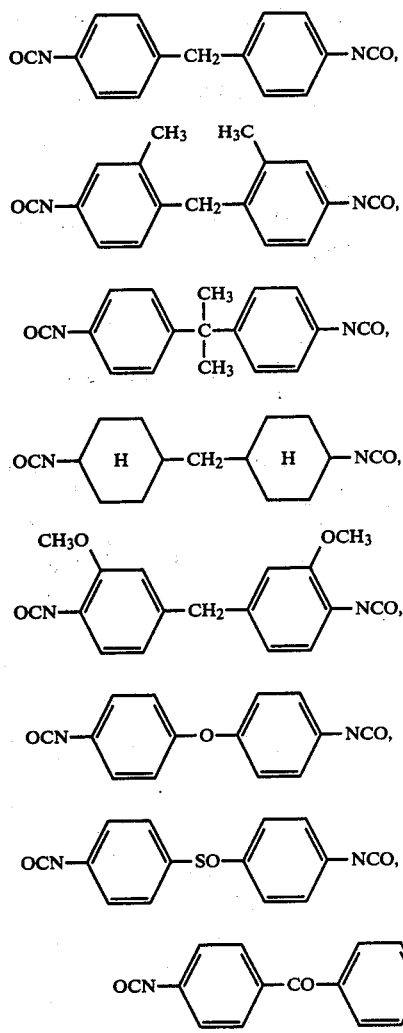

lysine diisocyanate, and
isophorone diisocyanate.

These diisocyanate compounds may be used singly or as a mixture of two or more.

Among these diisocyanate compounds, 1,6-hexamethylene diisocyanate, lysine diisocyanate, isophorone diisocyanate, dicyclohexylmethane-4,4'-diisocyanate, xylylene diisocyanate, and hydrogenated toluene diisocyanate have excellent resistance to yellowing.

In the production of the isocyanate-modified acrylic monomer, the hydroxyl-containing acrylic monomer is subjected to mono-addition reaction with the diisocyanate compound. It is advantageous in this case to use 0.6 to 1.4 moles, preferably 0.9 to 1.1 moles, of the acrylic monomer per mole of the diisocyanate compound.

Mono-addition reaction can be performed by contacting the two reactants in a customary manner. Generally, the reaction can be carried out at a temperature of about 20° to about 150° C. for a period of about 0.5 to about 40 hours. If desired, it is advantageous to use a polymerization inhibitor such as hydroquinone, ditertiary butyl hydroxytoluene, methoxyphenol, tertiary butyl catechol and benzoquinone in the addition reaction as required.

Thus, an isocyanate-modified acrylic monomer containing one free isocyanate group is obtained.

Vinyl isocyanate or the isocyanate-modified acrylic monomer prepared as above adds to the vinyl polymer by the reaction of the free isocyanate in the isocyanate compound with the hydroxyl group of the hydroxyl-containing vinyl polymer, thereby forming the water-soluble resin in accordance with this invention.

The reaction may be carried out in a customary manner in the inert solvent exemplified hereinabove. Usually, the reaction is carried out at a reaction temperature of about 20° to about 150° C. for a reaction period of about 0.5 to about 40 hours. As required, known reaction catalysts and polymerization inhibitors may be used.

In obtaining the water-soluble resin in accordance with the above reaction, the amount of the vinyl isocyanate or the isocyanate-modified acrylic monomer to be reacted with the vinyl polymer having a carboxyl group and a hydroxyl group is generally 0.1 to 30% by weight, preferably 0.5 to 10% by weight, based on the total weight of the vinyl polymer and the vinyl isocyanate or the isocyanate-modified acrylic monomer.

(C) Water-soluble resins having a monomer containing both a radical-polymerizable unsaturated group and at least one graft-polymerizable unsaturated group in one molecule as an essential component:

This type of water-soluble resin is a copolymer obtained by copolymerizing (i) a monomer containing both one radical-polymerizable unsaturated group of the formula

wherein $R_4$ represents a hydrogen atom or a methyl group and $R_5$ represents

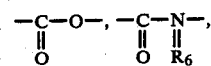

a phenylene group, or a lower alkenylene group, and $R_6$ represents a hydrogen atom or a methyl or ethyl group, and at least one graft polymerizable unsaturated group in one molecule, (ii) an α,β-ethylenically unsaturated acid, and/or a monoester of a polyalkylene glycol with acrylic or methacrylic acid, and (iii) another radical-polymerizable unsaturated monomer.

The "radical polymerizable unsaturated group" contained in the monomer (i) which is represented by general formula (II) above specifically includes, for example, $CH_2=CHCOO-$, $CH_2=C(CH_3)COO-$,

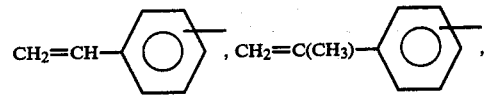

$CH_2=CHCONH-$, $CH_2=C(CH_3)CONH-$ and $CH_2=CH-CH=CH-$. Of these, $CH_2=CHCOO-$ and $CH_2=C(CH_3)COO-$ are preferred.

The "graft-polymerizable unsaturated group" denotes a group derived from an unsaturated compound having a hydrogen atom which is active in a radical chain transfer reaction at the beta-position of an unsaturated group. It should exhibit low activity in a radical polymerization reaction and can exist as an active site for a grafting reaction in the copolymer obtained by the radical copolymerization of the monomers (i), (ii) and (iii).

A preferred group of graft-polymerizable unsaturated groups include unsaturated groups of the following formulae

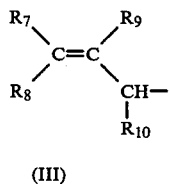 and 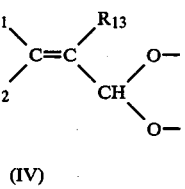

(III)    (IV)

wherein each of $R_7$ through $R_{13}$ represents a hydrogen atom or a $C_{1-8}$ alkyl group.

Another suitable group of unsaturated groups include unsaturated groups derived from 5- or 6-membered cyclic compounds having an intra-ring carbon-carbon double bond, for example

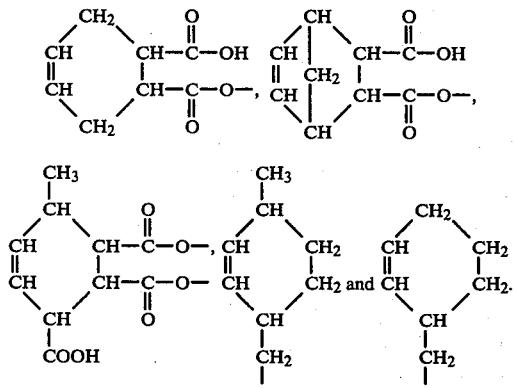

Specific examples of the graft-polymerizable unsaturated group represented by formula (III) or (IV) above are $CH_2=CH-CH_2-O-$, $CH_3-CH=CH-CH_2-O-$, $CH_2=CH(CH_3)-CH_2-O-$, $CH_2=CH-CH(CH_3)-O-$, and

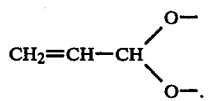

Of these, $CH_2=CH-CH_2-O-$ and

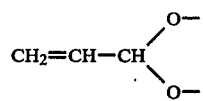

are preferred.

The monomer (i) may contain one radical polymerizable unsaturated group described above and at least one, advantageously 1 to 3, graft-polymerizable unsaturated groups. The monomer (i) may also contain an atomic grouping inert to the polymerization in addition to the above two kinds of unsaturated groups. The monomer (i), on the whole, may have a molecular weight of generally in the range of 100 to 400. Specific examples of the monomer (i) are given below.

(1) Esters formed between acrylic or methacrylic acid and a monohydric alcohol selected from allyl alcohol, ethylene glycol monoallyl ether, trimethylolpropane diallyl ether and a condensation product between acrolein and trimethylolethane, trimethylolpropane or glycerol.

(2) Adducts of acrylic or methacrylic acid with allyl glycidyl ether.

(3) Products obtained by reacting a hydroxyl-containing acrylic monomer [for example, a hydroxyalkyl (meth)acrylate such as hydroxyethyl acrylate, hydroxyethyl methacrylate, hydroxypropyl acrylate or hydroxypropyl methacrylate] and the monohydric alcohol mentioned in (1) above with a diisocyanate compound (aliphatic, alicyclic and aromatic diisocyanate compounds usually employed in the production of polyurethane).

(4) Esterification products formed between tetrahydrophthalic anhydride, 3,6-endomethylenetetrahydrophthalic anhydride, etc. and the hydroxyl-containing acrylic monomer described in (3) above.

The $\alpha,\beta$-ethylenically unsaturated acid (ii) used to impart water-solubility to the copolymer obtained includes aliphatic unsaturated mono- or di-carboxylic acids having 3 to 22 carbon atoms, preferably 3 to 6 carbon atoms, the anhydrides or monoesters of the dicarboxylic acids, and vinyl aromatic mono- or di-sulfonic acids having 8 to 12 carbon atoms. Specific examples are $\alpha,\beta$-ethylenically unsaturated carboxylic acids such as acrylic acid, methacrylic acid, crotonic acid, itaconic acid, maleic acid, maleic anhydride, fumaric acid, and mono-($C_1$-$C_8$) alkyl esters of maleic acid, and $\alpha,\beta$-ethylenically unsaturated sulfonic acids such as styrenesulfonic acid. They may be used either singly or as a mixture of two or more.

The "monoester between a polyalkylene glycol and acrylic or methacrylic acid" used as the component (ii) includes products obtained by esterifying one OH of the polyalkylene glycol such as polyethylene glycol or polypropylene glycol having a molecular weight of usually 40 to 500, preferably 80 to 400, with acrylic or methacrylic acid.

The monoester compound may be used singly or in combination with the $\alpha,\beta$-ethylenically unsaturated acid as the component (ii).

The "other radical polymerizable unsaturated monomer" (iii) which can be radical-polymerized with the monomer components (i) and (ii) may be any monomer which has a radical-polymerizable ethylenically unsaturated bond ($^{\circ}C=C<$). In order that the polymerization may not be hampered by a graft-polymerizable unsaturated group such as an allyl group, it may be selected broadly from monomers having a Q value, in the "Q-e theory", of at least 0.1 depending upon the properties desired of the aqueous emulsion composition as a final product. Typical examples of such an unsaturated monomer are the same as shown in section (A), (a) to (c) given hereinabove. These unsaturated monomers may be used singly or as a mixture of two or more.

Copolymerization of the monomer components (i), (ii) and (iii) can be performed by methods known per se for the production of acrylic copolymers, for example by the solution-polymerization, emulsion-polymerization, or suspension-polymerization technique. Advantageously, it is carried out in accordance with the solution-polymerization method. It can be carried out by reacting the three components in a suitable inert solvent in the presence of a polymerization catalyst at a reaction temperature of usually about 0° to about 180° C., preferably about 40° to about 170° C., and for a reaction period of about 0.5 to about 20 hours, preferably about 2 to about 10 hours.

The solvent used is desirably a water-miscible solvent capable of dissolving the resulting copolymer so that gellation does not occur during the copolymerization reaction. Examples of the solvent are Cellosolve-type solvents, carbitol-type solvents, glyme-type solvents, Cellosolve acetate-type solvents and alcohol-type solvents.

The polymerization catalyst may be a radical initiator for usual radical polymerization, such as azo compounds, peroxide compounds, sulfides, sulfines, diazo compounds, nitroso compounds, and redox systems.

In performing the copolymerization, the mixing proportions of the three components may be varied depending upon the properties desired of the aqueous emulsion composition as a final product. The suitable proportions based on the total weight of the three components are as follows:

Monomer component (i):
  0.1 to 30% by weight, preferably 0.5 to 10% by weight
Monomer component (ii):
  2 to 60% by weight, preferably 5 to 30% by weight, when the $\alpha,\beta$-ethylenically unsaturated acid is used; 10 to 80% by weight, preferably 20 to 50% by weight, when the monoester of the polyalkylene glycol and acrylic or methacrylic acid is used; the amount of the monoester may be below 10% by weight when the two compounds are conjointly used.
Monomer component (iii):
  10 to 97.9% by weight, preferably 50 to 90% by weight.

The method for producing the water-soluble resin (C) described above, although limited in the types of monomers to be chosen, is especially advantageous in commercial practice because it does not involve reaction of the monomer with the polymer and can easily afford the desired product when practiced within the ranges described herein.

It is very desirable that the water-soluble resin obtained by the processes (A) to (C) described above has an acid value of 10 to 350, preferably 20 to 250, more preferably 30 to 200, and a number average molecular weight, as determined by gal permeation chromatography, of 500 to 100,000, preferably 800 to 50,000 more preferably 1,000 to 20,000. For this purpose, it is desirable to adjust the amount of the carboxyl groups in the preparation of the vinyl polymer so that the resulting water-soluble resin has the aforesaid acid value, and to adjust the reaction conditions such that the number average molecular weight of the resin falls within the aforesaid range.

The resulting water-soluble resin is water-solubilized either as such or after at least a part of the solvent has been distilled off from it. The water-solubilization can be performed in a customary manner by, for example, neutralizing the carboxyl groups present in the resin with a conventional known neutralizing agent such as an amine, ammonia, or an alkali metal hydroxide.

When the monoester of acrylic or methacrylic acid and the polyethylene glycol or polypropylene glycol is used as one monomer component constituting the water-soluble resin in accordance with this invention, water-solubilization of the resin may sometimes be achieved without neutralization of the carboxyl groups. To achieve this, it is necessary to impart a high level of hydrophilicity to the copolymer itself by copolymerizing a large proportion (10 to 90% by weight, preferably 20 to 80% by weight) of the monoester. In this case, too, neutralization of the carboxyl groups may be employed together to achieve water solubilization.

According to this invention, a radical-polymerizable unsaturated monomer is emulsion-polymerized in an aqueous medium in the presence of the aforesaid water-soluble resin as a dispersion stabilizer. The "radical-polymerizable unsaturated monomer" is not particularly restricted so long as it has compatibility with the water-soluble resin and has moderate hydrophilicity. Typical examples of this monomer are shown below.

(i) Vinyl aromatic compounds:
$C_8$–$C_{10}$ vinylbenzene derivatives such as styrene, $\alpha$-methylstyrene and vinyltoluene, and vinyl heteroaromatic compounds such as vinylpyridine.

(ii) Acrylic or methacrylic acid esters:
$C_1$–$C_{20}$ alkyl or cycloalkyl esters of acrylic or methacrylic acid such as methyl acrylate, ethyl acrylate, propyl acrylate, isopropyl acrylate, butyl acrylate, hexyl acrylate, lauryl acrylate, cyclohexyl acrylate, methyl methacrylate, ethyl methacrylate, propyl methacrylate, isopropyl methacrylate, butyl methacrylate, hexyl methacrylate, octyl methacrylate, lauryl methacrylate and cyclohexyl methacrylate; adducts between glycidyl acrylate or glycidyl methacrylate and $C_2$–$C_{20}$ monocarboxylic acid compounds (such as acetic acid, propionic acid, oleic acid, stearic acid and lauric acid); alkoxyalkyl esters of acrylic or methacrylic acid such as methoxybutyl acrylate, methoxyethyl acrylate, ethoxybutyl acrylate, methoxybutyl methacrylate, methoxyethyl methacrylate and ethoxybutyl methacrylate; condensation products between $C_2$–$C_8$ hydroxyalkyl esters of acrylic or methacrylic acid (such as hydroxyethyl acrylate, hydroxypropyl methacrylate or hydroxyethyl methacrylate) and the aforesaid $C_2$–$C_{20}$ monocarboxylic acid compounds.

(iii) Polyenes having 2 to 8 carbon atoms such as butadiene, isoprene and chloroprene.

(iv) Vinyl esters of carboxylic acids such as vinyl acetate and Veova monomer (a tradmark for a product of Shell Chemical Co.).

(v) Other monomers such as vinyl chloride, vinylidene chloride, and monolefins such as ethylene, propylene and isobutene.

The vinyl aromatic compounds and the acrylic or methacrylic acid esters are especially preferred as the radical-polymerizable unsaturated monomer for use in this invention.

The unsaturated monomer is selected depending upon the properties desired of the final emulsion composition. These unsaturated monomers may be used singly or as a mixture of two or more. When a non-hydrophilic monomer is used as the unsaturated monomer, it may be used together with not more than 50% by weight, preferably not more than 30% by weight, based on the total weight of the monomers used, of a hydrophilic unsaturated monomer. Examples of the hydrophilic unsaturated monomer include 2-hydroxyethyl acrylate, 2-hydroxyethyl methacrylate, 2-hydroxypropyl acrylate, 2-hydroxypropyl methacrylate, acrylonitrile, methacrylonitrile, acrylic acid, methacrylic acid, glycidyl acrylate, glycidyl methacrylate, acrylamide, N-n-butoxymethyl acrylamide, vinylpyridine, N-methylol acrylamide and methacrylamide. These hydrophilic unsaturated monomers may be used singly or as a mixture of two or more.

The emulsion polymerization is carried out by known conventional methods. For example, it is carried out in the presence of the aforesaid dispersion stabilizer with stirring or in the stationary state at a temperature above the freezing point of water but below the boiling point of water using the aforesaid polymerization initiator as required. The aqueous medium used as the reaction medium in the emulsion polymerization may be water itself, or a mixture of water and the aforesaid water-miscible organic solvent.

The amount of the water-soluble resin used as a dispersion stabilizer is generally 5 to 80% by weight, preferably 10 to 40% by weight, based on the total amount of the water-soluble resin and the unsaturated monomer.

The aqueous emulsion composition so obtained can be used in the as-obtained form as a film-forming component in coating compositions and adhesives. The emulsion composition may, as required, contain other water-soluble resins, extender pigments, coloring pigments, rust inhibitors, plasticizers, organic solvents, etc. in the amounts usually employed.

The aqueous emulsion composition of this invention exhibits excellent dispersion stability because the water-soluble resin as a dispersion stabilizer is moderately subject to grafting reaction with the radical-polymerizable unsaturated monomer during the emulsion polymerization and the grafted product is well entangled with the resulting polymer emulsion particles.

Films formed from the aqueous emulsion composition of this invention have the advantage of possessing excellent water resistance, yellowing resistance, gloss, etc. and of not exhibiting a tacky feel. It is further characterized by the fact that when used as a component of an adhesive, it does not stain the surface of the adhesive agent.

The aqueous emulsion of this invention may be used as a versatile paint either as such or in combination with another water-soluble or water-dispersible resin. Coated films obtained therefrom cure sufficiently even at ordinary temperatures, but if required, may be heated. The emulsion composition of this invention is also useful in such other applications as adhesives and resin treatment.

The following examples further illustrate the present invention. Unless otherwise specified, all percentages in these examples are by weight.

EXAMPLE 1

Butyl Cellosolve (556 g) was added to a 2-liter four-necked flask, and heated to 120° C. A mixture of 77 g of ethyl acrylate, 73 g of methyl methacrylate, 108 g of acrylic acid, 198 g of 2-ethylhexyl methacrylate and 32 g of azobisdimethylvaleronitrile was added dropwise over 2 hours. One hour after the addition, 5 g of azobisisobutyronitrile was added. Then, the temperature of the contents was gradually raised and brought to 158° C. in two hours. At this temperature, the reaction was carried out for one hour.

Then, the temperature of the contents was lowered to 130° C., and 30 g of glycidyl methacrylate was added dropwise to the reaction mixture over 30 minutes. The reaction was performed then at 135° C. for 2 hours until the acid value of the reaction mixture became constant. After the reaction, a part of the butyl Cellosolve was removed to afford a solution of a water-soluble resin having an acid value of 109 and a solids content of 80.9%.

The resulting resin solution (99 g), 37 g of butyl Cellosolve and 207 g of n-butyl methacrylate were mixed to form a solution. To the solution were added 11 cc of 29% aqueous ammonia and 362 g of water, and the mixture was stirred. A solution of 0.5 g of ammonium persulfate in 5 g of water was added to the resulting aqueous dispersion, and the mixture was heated at 80° C. for 3 hours. The properties of the resulting emulsion composition and a coated film from prepared therefrom are shown in Table 1.

EXAMPLE 2

An emulsion composition was prepared by the same method and formulation as in Example 1 except that 104 g of n-butyl acrylate and 103 g of styrene were used instead of 207 g of n-butyl methacrylate used in Example 1. The properties of the resulting emulsion composition and a film prepared therefrom are shown in Table 1.

EXAMPLE 3

Toluene (556 g) was added to a 2-liter four-necked flask, and heated to 110° to 120° C. A mixture of 77 g of ethyl acrylate, 173 g of methyl methacrylate, 198 g of 2-ethylhexyl methacrylate, 193 g of acrylic acid, 15 g of hydroxyethyl methacrylate and 32 g of azobisdimethylvaleronitrile was added dropwise over 2 hours. One hour after the addition, 5 g of azobisdimethylvaleronitrile was added, and the reaction was performed at the same temperature for 6 hours to afford a solution of an acrylic polymer having a carboxyl group and a hydroxyl group.

Separately, 696 g of tolylene diisocyanate was added to a 2-liter four-necked flask, and heated to 50° C. A solution containing 520 g of hydroxyethyl methacrylate and 1 g of hydroquinone was added dropwise over 4 hours. Then, the reaction was continued at this temperature for 3 hours. The reaction mixture was put into a can, sealed and left to stand at room temperature for 1 day. Thus, an isocyanatemodified acrylic monomer as a white wax was obtained.

To the acrylic polymer solution obtained was added 60 g of the isocyanate-modified acrylic monomer, and they were reacted at 80° C. for 2 hours. After the reaction, toluene was removed by distillation under reduced pressure. When about half of the toluene was removed, 200 g of butyl Cellosolve was added, and the remaining toluene and a part of the butyl Cellosolve were removed. Thus, a solution of a water-soluble resin having an acid value of 100 and a solids content of 80% was obtained.

One hundred grams of the resin solution, 36 g of butyl Cellosolve and 207 g of n-butyl methacrylate were mixed, and to the resulting mixture were added 11 cc of 29% aqueous ammonia and 362 g of water, and the mixture was stirred. To the resulting aqueous dispersion was added a solution of 0.5 g of ammonium persulfate in 5 g of water, and the mixture was heated at 80° C. for 3 hours. The properties of the resulting emulsion composition and a film prepared therefrom are shown in Table 1.

COMPARATIVE EXAMPLE 1

A 2-liter four-necked flask was charged with 500 g of butyl Cellosolve and 130 g of acetone, and they were heated to 85° C. A mixture of 80 of ethyl acrylate, 180 g of methyl methacrylate, 103 g of acrylic acid, 267 g of 2-ethylhexyl methacrylate and 32 g of azobisdimethylvaleronitrile was added dropwise over 2 hours. At the end of the addition, the temperature of the reaction mixture reached 110° C. Azobisisobutyronitrile (5.2 g) was added 1 hour and 2 hours respectively after the addition, and the mixture was heated at 110° C. for 2 hours. After the reaction, acetone and a part of the butyl Cellosolve were removed by distillation under reduced pressure to afford a solution of a water-soluble resin having an acid value of 102 and a solids content of 69.2%.

The resulting resin solution (116 g), 21 g of butyl Cellosolve and 207 g of n-butyl methacrylate were mixed to form a solution, and 11 cc of 29% aqueous ammonia and 362 g of water were added to the solution. The mixture was well stirred to form an aqueous dispersion. A solution of 0.5 g of ammonium persulfate in 5 g of water was added to the aqueous dispersion, and the mixture was heated at 80° C. for 3 hours. The properties of the resulting emulsion composition and a film prepared therefrom are shown in Table 1.

COMPARATIVE EXAMPLE 2

An attempt was made to prepare an emulsion by the same method as in Comparative Example 1 except that 104 g of n-butyl acrylate and 103 g of styrene were used instead of 207 g of the n-butyl methacrylate used in Comparative Example 1. No emulsion composition could be obtained.

TABLE 1

| Properties of the emulsion composition and coated film | Example (Ex.) or Comparative Example (CEx.) | | | |
|---|---|---|---|---|
| | Ex. 1 | Ex. 2 | Ex. 3 | CEx. 1 |
| **Properties of the emulsion(*)** | | | | |
| Solids content (%) | 39.1 | 38.4 | 39.4 | 39.1 |
| Condition (after 7 day standing) | ○ | ○ | ○ | X |
| Viscosity (centipoises) | 54 | 80 | 58 | 170 |
| **Properties of the coated film(*)** | | | | |
| Condition of the paint surface by visual observation | ○ | ⊚ | ⊚ | Δ |
| Gloss | 82.4 | 114.6 | 72.0 | 11.7 |
| Hardness (2 days after drying) | 2B | 2B | 2B | 3B |
| Hardness (10 days after drying) | F | HB | F | F |
| Bending test | ○ | ○ | ○ | ○ |
| Water resistance | ○ | ○ | ○ | ○ |
| Polishability | Δ | Δ | Δ | Δ |

(*)The properties of the emulsion composition and the coated film were tested by the following methods.

Condition of the emulsion
  The emulsion was observed visually to determine whether a precipitate formed.
Viscosity
  Measured at 30 ppm using a Brookfield viscometer.
Gloss
  The 20° mirror-surface reflection of a coat film on a glass plate was measured.
Hardness
  The pencil hardness of a coated film on a surface-treated steel plate was measured 2 days and 10 days, respectively, after drying.

Bending test
  A coated film on a surface-treated steel plate was bonded by an angle of 180° C. by a bending tester having a rod with a diameter of 1 cm, and the bended state was observed.
Water resistance
  Water was placed on the surface of a film coated on a surface-treated steel plate 10 days after drying, and a change in the coated film was observed 2 hours later.
Polishability
  The surface of a coated film was polished 10 times with a No. 400 water-resistant abrasive paper, and then the state of the abrasive paper was examined. The state in which the coated film does not stick to the abrasive paper is good.

The results of the tests were evaluated on a scale of five grades, ⊚, ○, Δ, ⊘ and X in which ⊘ to ⊚ show that the coated film is practical, and Δ and X show that the coated film is not practical.

EXAMPLE 4

A 2-liter four-necked flask was charged with 556 g of butyl Cellosolve and it was heated to 60° C. A mixture of 15 g of allyl methacrylate, 77 g of ethyl acrylate, 173 g of methyl methacrylate, 90 g of acrylic acid, 201 g of 2-ethylhexyl methacrylate and 32 g of azobisdimethylvaleronitrile and a mixture of 5 g of t-dodecyl mercaptan and 50 g of butyl Cellosolve were added dropwise over 3 hours at the same time from separate openings. One hour after the addition, 5 g of azobisdimethylvaleronitrile was added, and the mixture was left to stand for 2 hours. Thus, a solution of a water-soluble resin having an acid value of 130 and a solids content of 48.4% was obtained.

The resulting resin solution (165 g), 12 cc of 29% aqueous ammonia, 207 g of n-butyl methacrylate and 355 g of water were mixed, and the mixture was heated at 80° C. for 3 hours.

The properties of the resulting emulsion composition and a film prepared therefrom are shown in Table 2.

EXAMPLE 5

A 2-liter four-necked flask was charged with 556 g of butyl Cellosolve, and it was heated to 60° C. A mixture of 5 g of allyl methacrylate, 77 g of ethyl acrylate, 173 g of methyl methacrylate, 90 g of acrylic acid, 211 g of 2-ethylhexyl methacrylate and 32 g of azobisdimethylvaleronitrile was added dropwise over 3 hours. One hour after the addition, 5 g of azobisdimethylvaleronitrile was added, and the reaction was performed for 2 hours to afford a solution of a water-soluble resin having an acid value of 118 and a solids content of 50.5%.

The resulting resin solution (158 g), 11 cc of 29% aqueous ammonia, 207 g of n-butyl methacrylate and 355 g of water were mixed to form a dispersion. A solution of 0.5 g of ammonium persulfate in 5 g of water was added, and the mixture was heated at 80° C. for 3 hours.

The properties of the resulting emulsion composition and a film prepared therefrom are shown in Table 2.

COMPARATIVE EXAMPLE 3

A water-soluble resin solution was prepared in the same way as in Example 5 except that 2-ethylhexyl methacrylate was used instead of the allyl methacrylate. The resulting solution of water-soluble resin had an acid value of 124 and a solids content of 50.3%.

An emulsion composition was prepared in the same way as in Example 5 using the resulting resin solution.

The properties of the emulsion composition and a film prepared therefrom are shown in Table 2.

EXAMPLE 6

An emulsion composition was prepared in the same way as in Example 4 except that 104 g of n-butyl acrylate and 103 g of styrene were used instead of 207 g of n-butyl methacrylate in Example 4. The properties of the resulting emulsion composition and a film prepared therefrom are shown in Table 3.

COMPARATIVE EXAMPLE 4

Comparative Example 3 was repeated except that 104 g of n-butyl acrylate and 103 g of styrene were used instead of 207 g of n-butyl methacrylate.

The properties of the resulting emulsion composition and a film prepared from it are shown in Table 3.

EXAMPLE 7

A water-soluble resin solution having an acid value of 129 and a solids content of 48.0% was prepared in the same way as in Example 4 except that 250 g of i-butyl methacrylate was used instead of 250 g in total of ethyl acrylate and methyl methacrylate.

An emulsion composition was prepared in the same way as in Example 4 using the resulting resin solution.

The properties of the resulting emulsion composition and a film prepared therefrom are shown in Table 3.

EXAMPLE 8

A water-soluble resin solution having an acid value of 130 and a solids content of 48.1% was prepared in the same way as in Example 4 except that an adduct of allyl glycidyl ether and acrylic acid was used instead of the allyl methacrylate in Example 4.

An emulsion composition was prepared in the same way as in Example 4 using the resin solution.

The properties of the resulting emulsion composition and a film prepared therefrom are shown in Table 3.

TABLE 2

| Properties of the emulsion composition and the coated film | Ex. 4 | Ex. 5 | CEx. 3 |
|---|---|---|---|
| Properties of the emulsion(*) | | | |
| Solids content (%) | 38.2 | 39.7 | 38.6 |
| Transparency (mm) | 0.09 | O | O |
| Condition (after 7 day standing) | O | O | X |
| Viscosity (centipoises) | 1800 | 260 | 600 |
| Properties of the coated film(*) | | | |
| Condition of the paint surface (by visual observation) | ⊚ | O | △ |
| Gloss | 139.8 | 100.0 | 51.4 |
| Hardness (2 days after drying) | F | HB | B |
| Hardness (10 days after drying) | F | F | HB |
| Bending test | △ | △ | △ |
| Water resistance | ⊚ | O | △ |

TABLE 3

| Properties of the emulsion composition and the coated film | Ex. 6 | CEx. 4 | Ex. 7 | Ex. 8 |
|---|---|---|---|---|
| Properties of the emulsion composition(*) | | | | |
| Solids content (%) | 34.2 | 29.7 | 38.4 | 38.2 |
| Transparency (mm) | 0.32 | O | O | O |
| Condition (after 7 day standing) | O | O | O | O |
| Viscosity (centipoises) | 6000 | 130 | 4000 | 2000 |
| Properties of the coated film(*) | | | | |
| Condition of the paint surface (by visual observation) | O | X | O | ⊚ |
| Gloss | 115.6 | 76.7 | 120.7 | 124.0 |
| Hardness (2 days after drying) | B | B | HB | HB |
| Hardness (10 days after drying) | HB | HB | H | F |
| Bending test | O | O | △ | △ |
| Water resistance | △ | △ | | O |

(*)Methods for testing in Tables 2 and 3 were the same as described hereinabove with regard to Table 1 except as noted below.

Transparency

The thickness of an emulsion layer through which a 12-grade type closely adhered to a transparent glass plate can be read was determined.

What we claim is:

1. An aqueous emulsion composition which is the product of emulsion polymerization of at least one radical-polymerizable unsaturated monomer in the presence of a water-soluble resin having a graft-polymerizable unsaturated group in the side chain in water or a mixture consisting essentially of water and a water-miscible organic solvent, said water-soluble resin being a water-soluble resin formed by (A) co-polymerizing
   (i) a monomer containing one radical-polymerizable unsaturated group of the formula $$CH_2=C\begin{matrix}R_4\\R_5\end{matrix}$$

wherein $R_4$ is hydrogen or methyl, and $R_5$ is $$-\underset{\underset{O}{\|}}{C}-O-,\ -\underset{\underset{O}{\|}}{C}-\underset{\underset{R_6}{\|}}{N}-,$$

a phenylene group or a lower alkenylene group, wherein $R_6$ is hydrogen, methyl or ethyl, and at least one graft-polymerizable unsaturated group in one molecule,
   (ii) an $\alpha,\beta$-ethylenically unsaturated acid, and/or a monoester between a polyalkylene glycol and acrylic or methacrylic acid, and
   (iii) another radical-polymerizable unsaturated monomer having a Q value, in the Q-e theory, of at least 0.1, and (B) neutralizing the resulting copolymer in the presence of the radical-polymerizable unsaturated monomer.

2. The composition of claim 1 wherein the radical-polymerizable unsaturated group in the monomer (i) is $CH_2=CHCOO-$ or $CH_2=C(CH_3)COO-$.

3. The composition of claim 1 wherein the graft-polymerizable unsaturated group in the monomer (i) is

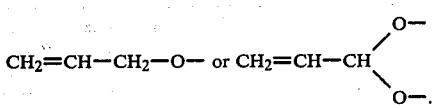

4. The composition of claim 1 wherein the α, β-ethylenically unsaturated acid (ii) is an aliphatic unsaturated mono- or di-carboxylic acid having 3 to 22 carbon atoms, an anhydride or monoester of said dicarboxylic acid, or a vinyl aromatic mono- or di-sulfonic acid having 8 to 12 carbon atoms.

5. The composition of claim 1 wherein said monoester between the polyalkylene glycol and acrylic or methacrylic acid is a product obtained by esterification of one OH of polyethylene glycol or polypropylene glycol having a molecular weight of 40 to 500 with acrylic or methacrylic acid.

6. The composition of claim 1 wherein the other radical-polymerizable unsaturated monomer (iii) is an ethylenically unsaturated monomer having a Q value, in the Q-e theory, of at least 0.1.

7. The composition of claim 1 wherein the compolymer is composed of 0.1 to 30% by weight of the monomer (i), 2 to 60% by weight of the α,β-ethylenically unsaturated acid or 10 to 80% by weight of the monoester as the monomer (ii), and 10 to 97.9% by weight of the monomer (iii).

8. The composition of claim 1 wherein the radical-polymerizable unsaturated monomer is a vinyl aromatic compound or an acrylic or methacrylic acid ester.

9. The composition of claim 1 wherein the proportion of the water-soluble resin is 5 to 80% by weight based on the total weight of the water-solulbe resin and the radical-polymerizable unsaturated monomer.

10. A coating composition comprising the aqueous emulsion composition set forth in any one of claims 10–15, 17, 18, 11 and 1 as a film-forming component.

11. The composition of claim 1 wherein the water-soluble resin, prior to neutralization, has an acid value of 10 to 350 and a number average molecular weight, as determined by gel permeation chromatography, of about 500 to about 100,000.

12. The composition of claim 1 which is produced without the aid of an ionic or nonionic low molecular or high molecular surface-active substance.

* * * * *